May 22, 1945.  L. A. PARADISE ET AL  2,376,618
CYLINDER ADJUSTING DEVICE
Filed June 18, 1943   2 Sheets-Sheet 1
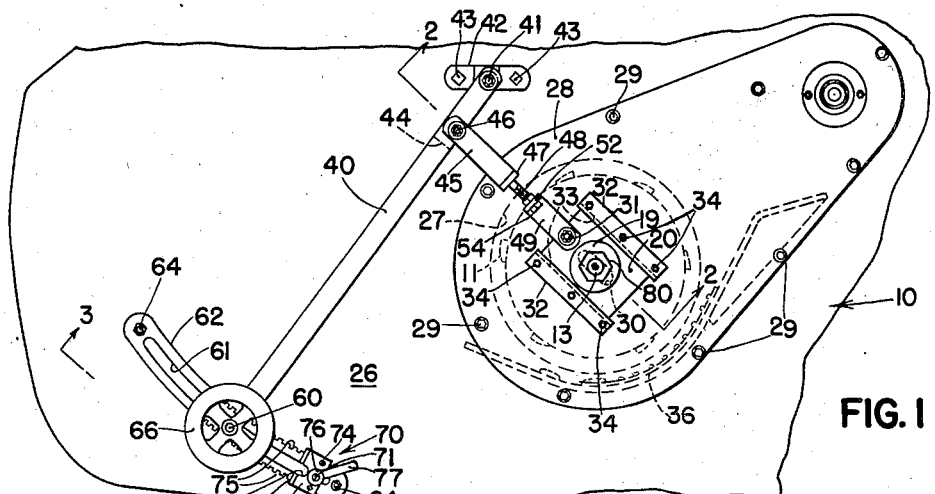
FIG. 1
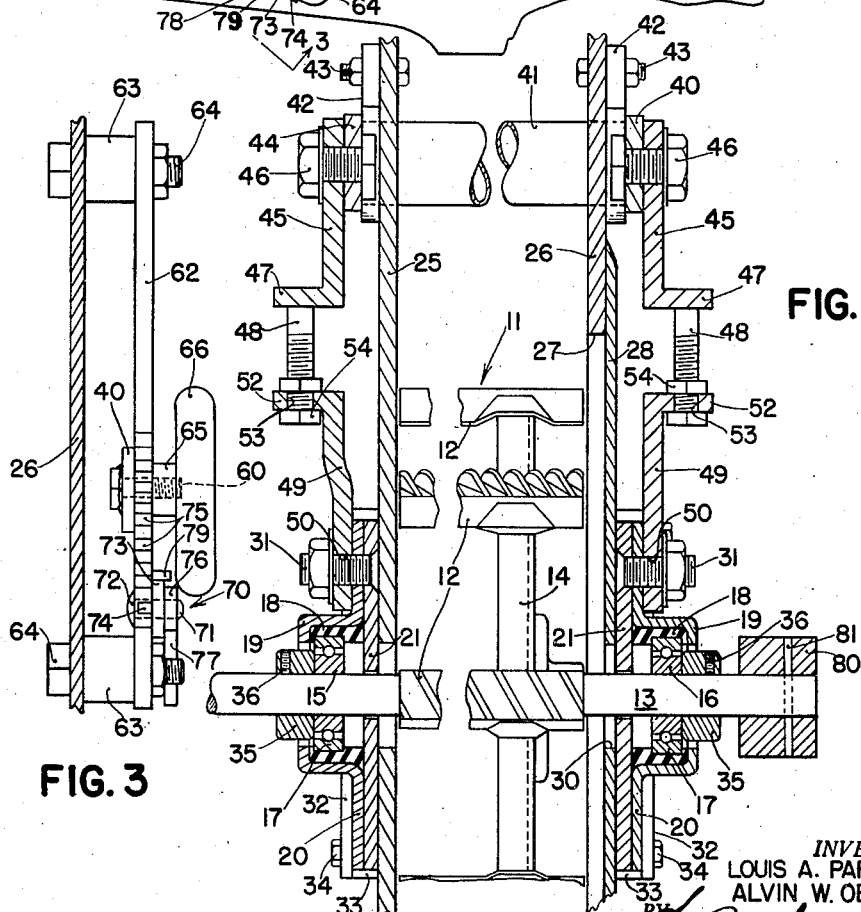
FIG. 2
FIG. 3
INVENTORS
LOUIS A. PARADISE
ALVIN W. OEHLER
ATTORNEYS May 22, 1945.　　L. A. PARADISE ET AL　　2,376,618
CYLINDER ADJUSTING DEVICE
Filed June 18, 1943　　2 Sheets-Sheet 2
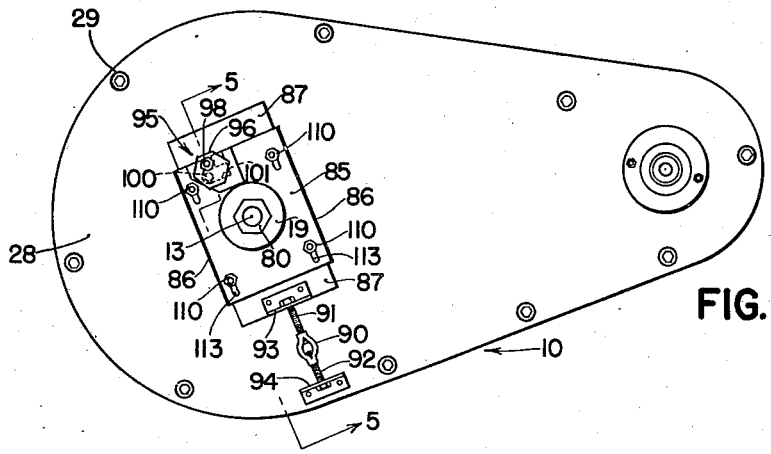
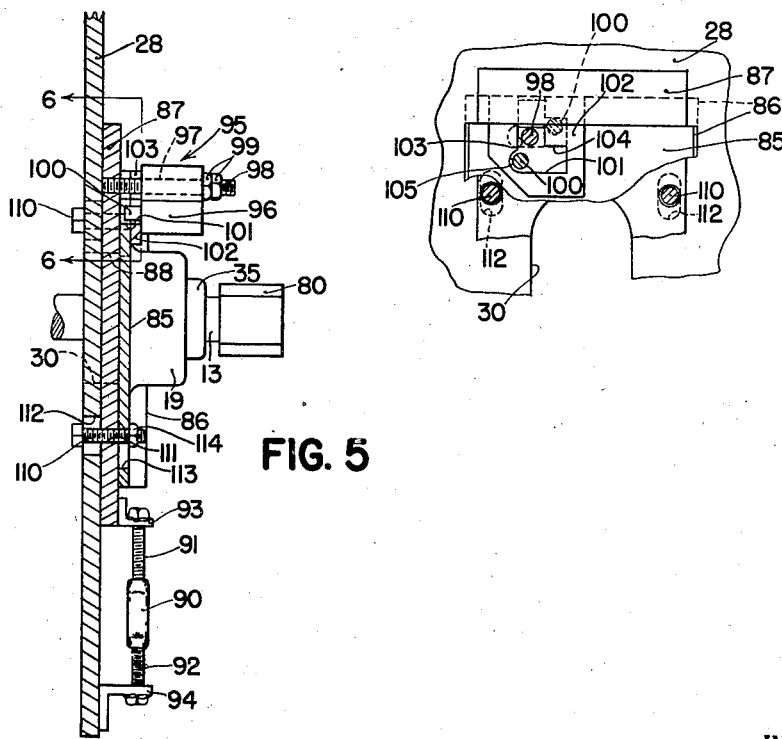
INVENTORS
LOUIS A. PARADISE
ALVIN W. OEHLER
BY
ATTORNEYS Patented May 22, 1945

2,376,618

UNITED STATES PATENT OFFICE 2,376,618

CYLINDER ADJUSTING DEVICE

Louis A. Paradise and Alvin W. Oehler, Moline, Ill., assignors to Deere & Company, Moline, Ill., a corporation of Illinois Application June 18, 1943, Serial No. 491,424

17 Claims. (Cl. 130—27)

The present invention relates generally to agricultural implements, and more particularly to implements of the type having crop treating cylinders, and has for its principal object the provision of a novel and improved adjustable mounting for the cylinder bearings.

Heretofore, cylinder bearings have been adjustably mounted in order to provide for adjusting the clearance between the cylinder and the concave. This adjustment is used for obtaining different amounts of clearance for different crops and crop conditions, as is well-known in the art. Under certain conditions, however, the cylinder tends to clog frequently, making it necessary to shut down and clear out the wad of crop material or weeds that is wedged between the cylinder and concave. Considerable time has been lost in these clean-out operations in the past, especially where it is necessary to raise the cylinder away from the concave in order to free the wad of material. Furthermore, it is sometimes desirable to attach strips of rubber belting on the concave, which interfere with turning the cylinder backwards to clear out the crop material, making it necessary to raise the cylinder away from the concave before turning it backwards. This is a comparatively slow operation with the usual threaded adjusting devices for raising the cylinder away from the concave, and requires close attention to insure that the cylinder is returned once more to its proper operating position.

It is a specific object of the present invention therefore, to provide a means for quickly raising the cylinder away from the concave for clean-out purposes and returning it to operating position. Another object relates to the provision of means for adjustably determining the operating position to which the cylinder is returned. Still another object relates to the provision of a pair of adjustable devices for obtaining an accurate adjustment of the operating position and a temporary shift of the cylinder out of the operating position, and a related object is to provide a sufficient mechanical advantage for the shifting mechanism, so that the cylinder may be quickly and easily raised by hand, so that a minimum time is lost in clearing out the cylinder.

These and other objects and advantages of our invention will be apparent to those skilled in the art after a consideration of the following description, in which reference is had to the drawings appended hereto, illustrating two embodiments of our invention, in which Figure 1 is an elevational view showing the mounting of the bearing at one end of a combine cylinder;

Figure 2 is an enlarged sectional view taken along a line 2—2 in Figure 1, and showing the cylinder mountings at both ends of the cylinder;

Figure 3 is an enlarged sectional view taken along a line 3—3 in Figure 1;

Figure 4 is an elevational view showing a second embodiment of our invention;

Figure 5 is a sectional elevational view taken along a line 5—5 in Figure 4, and drawn to an enlarged scale; and Figure 6 is a section taken along a line 6—6 in Figure 5.

Referring now to the drawings and more particularly to Figures 1, 2 and 3, reference numeral 10 indicates in its entirety an agricultural implement, such as a combine, thresher, or any other machine of the class employing a rotary crop treating cylinder, the latter being indicated by reference numeral 11 and includes a plurality of threshing bars 12 mounted on a supporting shaft 13 by means of suitable spiders 14. The cylinder shaft 13 is rotatably supported, at opposite ends thereof, in a pair of anti-friction bearings 15, 16, respectively. The outer races 17 of the bearings 15, 16 are set in rubber rims 18, which are supported in cup-shaped bearing housings 19, respectively. Each cup-shaped housing 19 is supported on a plate 20, which is attached to an inner retaining plate 21, the latter lying against the inner surface of the plate 20 and extending beyond the annular rubber rim 18, to hold the latter within the cup-shaped housing 19.

The cylinder 11 is disposed within the side walls 25, 26 of the implement 10, one of the side walls 26 being provided with a large aperture 27 through which the cylinder 11 can be installed and removed. This aperture 27 is covered by a large side plate 28, which is secured to the side wall 26 by bolts 29. The cylinder shaft 13 extends through the aperture 27 and through an elongated slot 30 in the plate 28, thus providing for shifting movement of the cylinder 11, as will be described.

The plates 20, 21 of each bearing housing are secured together by means of a suitable bolt 31 and the edges of these plates are slidably confined within a pair of cleats 32 disposed along opposite edges of the plates 20, 21, parallel to the major axis of the slot 30. Each cleat 32 provides a groove 33 for receiving the edges of the plates 20, 21. Thus, the bearing 15 and its housing 19 are slidable on the outer surface of the wall 25, while the other bearing 16 and its housing 19 are slidable along the plate 28. The cleats 32 are secured to the wall 25 and plate 28, respectively, by suitable bolts 34. The bearings 15, 16 are also prevented from axial movement along the shaft 13 by retaining collars 35 secured to the shaft 13 by set screws 36.

Thus, by sliding the bearing supporting plates 20, 21 within the grooves 33 of the cleats 32, the cylinder can be shifted toward and away from the threshing concaves 36. The structure described hereinabove is similar to that shown in Patent No. 2,318,188, to which reference may be had for a more complete description of a cylinder mounting of this general type.

Coming now to that part of the structure with which the present invention is more directly concerned, the cylinder is raised and lowered by means of an arm or lever 40 fixedly mounted on a transverse rockshaft 41 in the form of a tubular member, journaled in a pair of brackets 42 attached by suitable bolts 43 to the side walls 25, 26, respectively. The rockshaft 41 extends through the body of the implement 10 generally above the cylinder 11. The opposite end of the rockshaft 41 is provided with an arm 44, rigidly fixed thereto, the arm 44 being considerably shorter than the control lever 40, as indicated in Figure 1. A pair of links 45 are pivotally connected by bolts 46 to the end of arm 44 and to the intermediate portion of lever 40, respectively. Each link 45 is provided with an outwardly turned end portion 47, to which is fixed a threaded stud 48, extending parallel to the link 45. The bearings are supported on the studs 48 by means of links 49 having apertures 50 at their lower ends adapted to receive the bolts 31, the upper ends of the links 49 being turned outwardly at 52 and having apertures 53 adapted to receive the ends of the studs 48, which are slidable therethrough. A pair of nuts 54 are provided on the threaded studs 48, on opposite sides of each of the end portions 52 for securing the latter to the studs 48. Thus, by adjusting the nuts 54 along the studs 48, the links 49 can be adjusted closer to or farther from the upper links 45.

The outer end of the lever 40 is provided with a threaded stud 60, rigidly welded to the end of the lever 40 and extending outwardly through an arcuate slot 61 in an arcuate bracket 62, carried on spacing blocks 63 at opposite ends of the bracket, and rigidly fixed to the side wall 26 by bolts 64 which extend through aligned apertures in the wall 26, blocks 63, and sector 62. A hand nut 65 is threaded on the end of the stud 60 and is provided with a hand wheel 66, whereby the lever 40 can be clamped to the sector 62 in any position within the range of the slot 61.

An adjustable limit stop device 70 is associated with the sector 62, for limiting the downward movement of the lever 40, and comprises a bolt 71 disposed within the slot 61 and having a head 72 engaging the underside of the sector 62. A plate 73 is apertured to receive the bolt 71 and lies against the outer surface of the sector 62. The plate 73 is provided with a pair of short pins or studs 74, which extend through notches 75 along each edge of the sector 62. The plate 73 is secured to the sector 62 by means of a nut 76 on the end of the stud 71. The nut has a handle 77 provided for hand operation. The function of the nut 76 is merely to prevent the plate 73 from falling away from the sector 62, while the pins 74 engage the notches 75 to positively secure the plate from sliding longitudinally of the sector 62. The plate 73 is provided with a notch 78 adapted to receive the stud 60, and has a bead 79 along the edge of the plate on each side of the notch 78 for the purpose of retaining the hand operated nut 65 against the stop plate to prevent the lever 40 and cylinder 11 from raising during operation.

The operation of this embodiment of our invention is as follows: The cylinder 11 is placed in normal operating position by swinging the lever 40 downwardly along the sector 62, with the hand nut 65 loosened sufficiently so that the nut 65 will pass over the bead 79 on the plate 73. With the lever 40 in this position against the stop plate 73, both cylinder bearings 15, 16 are secured in operating position by virtue of the interconnecting rockshaft 41 and the link connections between the rockshaft and the bearings. In case that it is necessary to clear a wad of crop material or weeds from between the cylinder 11 and concave 36, it is necessary to merely loosen the nut 65 by the hand wheel 66 and swing the lever 40 upwardly about its pivot axis, thereby rocking the rockshaft 41 and raising the cylinder bearings 15, 16 through the links 45 and 49. This is facilitated by the mechanical advantage obtained by virtue of the greater length of the lever 40 than of the arm 44. This raises the cylinder away from the concave 36 and permits the wad to be removed by hand or to be thrown out by slowly rotating the cylinder shaft 13. This can be done manually by placing a suitable wrench over a large nut 80, fixed to the end of the shaft 13 by a pin 81 or other suitable fastening means. With the cylinder in raised position, it can be turned either forwardly or backwardly with very little difficulty. After the cylinder has been cleared, the nut 65, which during the cleaning process has been tightened to clamp the arm 40 at the upper end of the slot 61, is again loosened and the arm 40 swung downwardly to its original position in engagement with the stop plate 73.

In case it is desired to change the clearance between the cylinder and the concave, the arm 40 is raised as before, and then the stop plate 73 is shifted by unscrewing the nut 76 until the plate can be moved away from the sector 62 or sufficient to disengage the pins 74 from the notches 75, after which the plate 73 and its bolt 71 can be shifted along the slot 61 to the desired position, and the pins 74 then inserted into the nearest notches 75. The nut 76 is then retightened and the arm 40 brought back to its operated position in engagement with the plate. This adjustment of the stop plate 73 is effective to adjust both ends of the cylinder shaft 13 alike, by virtue of the interconnecting rockshaft 41. A finer adjustment of the operating position of the cylinder can now be obtained, if desired, by adjusting the nuts 54 along the studs 48. One end of the cylinder can be adjusted relative to the other end, if necessary, by adjusting a pair of nuts 54 at one end of the cylinder and thus adjust the level of the cylinder. If desired, the cylinder clearance can be adjusted entirely by means of the nuts 54 without moving the stop plate 73.

It is evident that whenever the operating position of the cylinder has been determined by adjusting either the stop plate 73 or the nuts 54, or both, the cylinder can be raised out of such operating position for clean-out purposes but will always return to the last operating position when the arm 40 is returned to its engagement with the stop plate 73 and therefore it is possible with this device to clear out the cylinder and resume operation with very little time lost for this purpose.

Referring now to the embodiment of this invention as illustrated in Figures 4, 5 and 6, in which like numerals refer to like parts in Figures 1, 2 and 3, the cylinder shaft bearing is supported in a cup-shaped bearing housing 19 which is mounted on a mounting plate 85 provided with a pair of strengthening flanges 86 extending along opposite edges thereof, respectively. The plate 85 is slidably positioned in juxtaposition with an adjusting plate 87, which in turn, is slidable on the face of the cover plate 28 over the cylinder shaft receiving slot 30. The adjusting plate 87 is also provided with a slot 88, through which the cylinder shaft 13 extends. The plate 87 is adjusted relative to the cover plate 28 by means of a turnbuckle 90 which engages a pair of threaded bolts 91, 92, which are fixed, as by welding, to a pair of angle brackets 93, 94, respectively, the latter being rigidly mounted on the plate 87 and the cover plate 28, respectively. The bolts 91, 92 are threaded in opposite directions, so that by turning the turnbuckle 90 in one direction the plate 87 is shifted downwardly along the axis of the turnbuckle, while turning the latter in the opposite direction forces the plate 87 upwardly relative to the cover plate 28. This adjustment is made for the purpose of determining the operating position of the crop treating cylinder 11 relative to the concave 36.

The cylinder can be temporarily lifted away from the concave 36 by shifting the bearing supporting plate 85 relative to the plate 87. This is accomplished by means of a camming mechanism, indicated generally by reference numeral 95, which comprises a large nut 96 of hexagonal or other suitable shape adapted to receive a large wrench (not shown). The nut 96 is provided with an aperture 97, offset from the center of the nut, and the latter is rotatably mounted on a stud 98, which extends through the aperture 97 and is rigidly supported on the adjusting plate 87. The nut 96 is retained on the stud 98 by a pair of lock nuts 99, which are tightened relative to each other in a position on the stud 98 which permits free rotation of the nut 96 about the axis of the stud 98. The nut 96 is provided with an inwardly projecting peg 100, spaced from the axis of the aperture 97, which peg is adapted to project into a recess or slot 101, formed in a camming plate 102, the latter being rigidly fixed to the outer surface of the plate 85. The slot 101 extends transversely of the plate 102, the latter being also provided with a slot 103 extending upwardly substantially at right angles to the slot 101. The slot 103 is adapted to receive the stud 98 in the normal position of the plate 85, shown in solid lines in Figure 6.

It is now evident, that by turning the nut 96 in a counterclockwise direction, the peg 100 can be shifted about the axis of the stud 98 along the slot 101 and into engagement with the upper edge 104 of the latter, whereupon further rotation of the nut 96 about the axis of the stud 98, causes the peg 100, acting against the upper edge of the slot 101, to move the camming plate 102 and the supporting plate 85 upwardly relative to the adjusting plate 87 until it reaches the position indicated in dotted lines in Figure 6. In this position of the camming plate 102, the stud 98 occupies a position in the slot 101, the limit of upward movement being determined by engagement of the stud 98 with the lower edge of the last mentioned slot. By turning the nut 96 in a clockwise direction from the raised position, the camming plate 102 and the supporting plate 85 can be lowered once more to the normal operating position, and since the nut 96 can be rotated to shift the peg 100 beyond the center of the stud 98 into an extension 105 of the slot 101, the plate 85 is locked in a normal operating position by the over-center position of the peg 100.

The shifting movements of the plates 85, 87 are restricted to a direction parallel with the flanged edges 86 of the plates by means of a plurality of bolts 110, each of which extends through a suitable aperture 111 in the adjusting plate 87, and through elongated slots 112, 113 in the cover plate 28 and in the bearing supporting plate 85, respectively. Since the aperture 111 closely fits the bolt 110, the position of the latter is determined by the plate 87, while the slots 112, 113 permit relative movement between the plate 87 and each of the juxtaposed plates 28, 85. Each bolt 110 is provided with a nut 114, which can be tightened to secure the three plates 85, 87, 28 rigidly together for normal operation of the crop treating cylinder. In this normal operating position, the plate 85 occupies its lowest position within its range of shifting movement, and rests upon the bolts 110 so that the latter are at the upper ends of the slots 113, forming a stop for preventing any further downward movement of the plate 85.

Thus it will now be evident that the position of the cylinder shaft 13 is determined in operating position by the adjustment of the turnbuckle 90, which secures the adjusting plate 87 against movement in either direction, while the plate 85 is secured against upward movement relative to the plate 87 by the over-center position of the peg 100 relative to the stud 98. Since the bolts 110 fit accurately within the apertures 111 and the slots 112, 113, the plates 85, 87 are prevented from lateral movement relative to the cover plate 28.

When it is desired to adjust the operating clearance between the cylinder and concave, the nuts 114 are loosened, after which the turnbuckle 90 is turned in the proper direction to increase or decrease the clearance, by shifting the plate 87 relative to the cover plate 28. During this adjustment, the plate 85 moves along with the plate 87, since there is no relative movement therebetween. When it is necessary to clear a wad of crop material out from between the cylinder and concave, the nuts 114 are again loosened, after which the large nut 96 is turned by means of a large wrench in a counterclockwise direction, the peg 100 thereupon bearing against the upper edge 104 of the slot 101 to lift the plate 85 relative to the plate 87. After the cylinder has been cleared, the nut is returned to place the peg 100 in the over-center position shown in Figure 6, and inasmuch as the turnbuckle adjustment has not been disturbed by this movement of the cylinder and supporting plate 85, the cylinder is thereby returned to the operating position which was previously established by adjustment of the turnbuckle.

Therefore, since it is now evident that the setting of the cylinder in normal operating position is not disturbed by the temporary shifting of the cylinder out of this position for clean-out purposes, the clean-out operation is clearly expedited as no care is necessary in returning the cylinder after it has been raised for clean-out purposes.

We do not intend our invention to be limited by the exact details shown and described herein, except as defined by the claims which follow.

We claim:

1. In an agricultural implement including a rotary crop treating cylinder and a concave disposed beneath the latter and cooperable therewith, said cylinder having a shaft and a supporting bearing therefor, the combination of shiftable supporting means for said bearing, lifting means connected with said bearing for temporarily shifting said cylinder away from said concave for clean-out purposes, shiftable stop means for limiting the movement of said cylinder toward said concave, and means for adjustably fixing said stop means in adjusted position for predetermining the operating clearance between said cylinder and said concave.

2. In an agricultural implement including a rotary crop treating cylinder and a concave disposed beneath the latter and cooperable therewith, said cylinder having a shaft and a pair of supporting bearings at opposite ends thereof, respectively, the combination of shiftable supporting means for said bearings, lifting means for each of said bearings, means connecting said lifting means providing for simultaneously shifting both bearings to move said cylinder away from said concave for clean-out purposes, shiftable stop means for limiting the movement of said cylinder toward said concave, and means for adjustably fixing said stop means in adjusted position for predetermining the operating clearance between said cylinder and said concave.

3. In an agricultural implement including a rotary crop treating cylinder having a supporting shaft and a bearing for said shaft, the combination of a shiftable support for said bearing, an arm pivotally mounted on said implement and connected to said bearing support for temporarily shifting said cylinder away from operating position, and stop means for arresting movement of said arm and cylinder as the latter move into operating position, said stop means being adjustable to determine the operating position.

4. In an agricultural implement including a rotary crop treating cylinder having a supporting shaft and a bearing for said shaft, the combination of a shiftable support for said bearing, an arm pivotally mounted on said implement, link means connecting said bearing support to said arm intermediate its ends to provide a mechanical advantage for raising said cylinder from operating position, and stop means engageable with said arm as the latter swings to return said cylinder to operating position, said stop means being adjustable to determine the operating position.

5. In an agricultural implement including a rotary crop treating cylinder having a supporting shaft and a bearing for said shaft, the combination of a shiftable support for said bearing, a pivotally mounted lever connected to said bearing support for raising said cylinder from operating position, a sector associated with said lever, means on said lever engageable with said sector for securing the lever in several positions of adjustment, and an adjustable stop engageable with said lever for limiting movement of said lever as the latter swings to return said cylinder to operating position for determining the latter.

6. In an agricultural implement including a rotary crop treating cylinder having a supporting shaft and a bearing for said shaft, the combination of a shiftable support for said bearing, a pivotally mounted lever, extensible link means connecting said lever with said bearing support whereby said cylinder can be raised and lowered by swinging said lever, and a stop engageable with said lever for limiting movement of the latter into operating position, said stop being shiftable to several spaced positions and said extensible link means being adjustable to determine the operating position of said cylinder.

7. In an agricultural implement including a rotary crop treating cylinder having a supporting shaft and a bearing for said shaft, the combination of a shiftable support for said bearing, a pivotally mounted lever, extensible link means connecting said lever with said bearing support whereby said cylinder can be raised and lowered by swinging said lever, a sector associated with said lever, means on said lever engageable with said sector for securing the lever in raised and lowered positions of said cylinder, and a stop mounted on said sector and shiftable along the latter for limiting movement of said lever in the direction for lowering said cylinder to determine said operating position of the latter, said extensible link means providing an additional adjustment of said operating position.

8. In an agricultural implement including a crop treating cylinder having a supporting shaft and bearing means on which said shaft is journaled, the combination of mounting means for supporting said bearing means, said bearing means being shiftable relative to said mounting means and the latter being shiftable relative to the implement, mechanical adjusting means interconnecting said bearing means and said mounting means, and a second mechanical adjusting means connected between said mounting means and the implement, one of said adjusting means providing an accurate adjustment of the operating position of said cylinder and the other adjusting means providing for quickly shifting said cylinder out of operating position for cleanout purposes and returning it thereto.

9. In an agricultural implement including a crop treating cylinder having a supporting shaft and bearing means on which said shaft is journaled, the combination of mounting means for supporting said bearing means, said bearing means being shiftable relative to said mounting means and the latter being shiftable relative to the implement, adjusting mechanism interconnecting said bearing means and said mounting means, a second adjusting mechanism connected between said mounting means and the implement, and a stop for limiting the movement of one of said means in one direction, the associated adjusting mechanism serving to lock said means in normal operating position against said stop but operable to shift said means temporarily away from said stop for raising the cylinder for cleanout purposes, the other of said adjusting means serving to determine the position of said cylinder during operation.

10. In an agricultural implement including a crop treating cylinder having a supporting shaft and bearing means on which said shaft is journaled, the combination of mounting means for supporting said bearing means, said bearing means being shiftable relative to said mounting means and the latter being shiftable relative to the implement, toggle mechanism interconnecting said bearing means and said mounting means for shifting the cylinder to an inoperative position and for locking the same in operating position, and threaded adjusting means for shifting said mounting means to determine the operating position of said cylinder.

11. In an agricultural implement including a crop treating cylinder having a supporting shaft and a bearing for said shaft, the combination of a pair of superimposed plates slidable relative to each other and shiftably mounted on the implement, said bearing being mounted on one of said plates, means for adjustably fixing the other of said plates on said implement to determine the operating position of said cylinder, a limit stop on the last mentioned plate against which said bearing supporting plate normally abuts, and lever means mounted on one of said plates and connected with the other plate for sliding said bearing supporting plate away from said stop to shift the cylinder out of operating position for clean-out purposes and the like.

12. The combination set forth in claim 11, in which the connection between said lever means and said other plate includes a pin fixed to said lever means, said other plate being provided with a slot for receiving said pin.

13. In an agricultural implement including a rotary crop treating cylinder having a supporting shaft and a bearing for said shaft, the combination of a shiftable support for said bearing, a lever pivotally mounted on said implement and connected to said bearing support, said lever being swingable to temporarily shift said cylinder out of operating position, an arcuate sector associated with said lever, an adjustable stop shiftable along said sector, means for securing said stop to said sector in adjusted position, and means for securing said lever to said sector in engagement with said stop to determine said operating position.

14. In an agricultural implement including a rotary crop treating cylinder having a supporting shaft and a bearing for said shaft, the combination of a shiftable support for said bearing, a lever pivotally mounted on said implement and connected to said bearing support, said lever being swingable to temporarily shift said cylinder out of operating position, an arcuate sector associated with said lever, an adjustable stop shiftable along said sector, means for securing said stop to said sector in adjusted position, and disengageable means for securing said lever to said stop to determine said operating position.

15. In an agricultural implement including a rotary crop treating cylinder having a supporting shaft and a bearing for said shaft, the combination of a shiftable support for said bearing, a lever pivotally mounted on said implement and connected to said bearing support, said lever being swingable to temporarily shift said cylinder out of operating position, an arcuate sector associated with said lever, an adjustable stop shiftable along said sector, the latter having a series of serrations cooperable with said stop to hold the stop in adjusted position, and a clamp on said lever engageable with said stop to hold said arm and cylinder in operating position or engageable with said sector to hold said cylinder out of operating position.

16. In an agricultural implement including a rotary crop treating cylinder having a supporting shaft and a bearing for said shaft, the combination of a shiftable support for said bearing, a lever pivotally mounted on said implement and connected to said bearing support, said lever being swingable to temporarily shift said cylinder out of operating position, an arcuate sector associated with said lever, said sector having a slot extending lengthwise thereof, a stop member having a securing bolt adapted to extend through said slot for securing the member in adjusted positions along said sector, and a securing bolt on said lever adapted to extend through said slot for securing said lever to said sector, either in raised position of said cylinder or in operating position in engagement with said stop.

17. In an agricultural implement including a rotary crop treating cylinder having a supporting shaft and a bearing for said shaft, the combination of a shiftable support for said bearing, a lever pivotally mounted on said implement and conencted to said bearing support, said lever being swingable to temporarily shift said cylinder out of operating position, an arcuate sector associated with said lever, said sector having a slot extending lengthwise thereof, a stop member having a securing bolt adapted to extend through said slot for securing the member in adjusted positions along said sector, a securing bolt on said lever extending through said slot, and a nut on said bolt having a manually actuated handle for securing said lever to said sector, said stop member having a notch therein to receive said bolt when said lever is moved into operating position and means forming a recess in said stop member into which said nut seats to restrain movement of said lever away from said stop even though said nut is not tightened securely.

LOUIS A. PARADISE.
ALVIN W. OEHLER.